United States Patent
Schuierer

(10) Patent No.: US 8,037,129 B2
(45) Date of Patent: Oct. 11, 2011

(54) METHOD FOR GENERATING FUNCTION BLOCKS FOR WEB SERVICES

(75) Inventor: Wolfgang Schuierer, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 12/378,792

(22) Filed: Feb. 19, 2009

(65) Prior Publication Data

US 2009/0210540 A1 Aug. 20, 2009

(30) Foreign Application Priority Data

Feb. 20, 2008 (EP) .................................. 08003134

(51) Int. Cl.
*G06F 15/16* (2006.01)
(52) U.S. Cl. ........ 709/203; 709/223; 709/220; 709/228; 719/328
(58) Field of Classification Search .................. 709/203, 709/227–228
See application file for complete search history.

(56) References Cited

U.S. PATENT DOCUMENTS

| | | | | |
|---|---|---|---|---|
| 6,915,330 | B2 * | 7/2005 | Hardy et al. ................. | 709/203 |
| 7,159,007 | B2 * | 1/2007 | Stawikowski ................. | 709/202 |
| 7,822,495 | B2 * | 10/2010 | Nixon et al. ................. | 700/87 |
| 2002/0016815 | A1 | 2/2002 | Hardy et al. | |
| 2004/0060057 | A1 * | 3/2004 | Hansen et al. ................ | 719/328 |
| 2004/0128400 | A1 | 7/2004 | Srinivasan et al. | |
| 2005/0071448 | A1 * | 3/2005 | Katz et al. ................. | 709/223 |
| 2006/0235976 | A1 * | 10/2006 | Chen et al. ................. | 709/227 |
| 2007/0055678 | A1 * | 3/2007 | Fung et al. ................. | 707/100 |
| 2008/0025316 | A1 * | 1/2008 | Schoning et al. ............ | 715/733 |
| 2008/0228796 | A1 * | 9/2008 | Angelov ................. | 707/101 |
| 2009/0319680 | A1 * | 12/2009 | Owen et al. ................. | 709/230 |

OTHER PUBLICATIONS

E. Michael Maximillien, Munindar P. Singh; "Toward Web Services Interaction Styles"; Services Computing, 2005 IEEE International Conference on Services Computing; Jul. 11-15, 2005; pp. 147-154; XP010852248; ISBN: 978-0-7695-2408-5.

* cited by examiner

*Primary Examiner* — Abdullahi Salad

(57) ABSTRACT

In continuous operation, for example during the control of a machine, PLCs (programmable logic controllers) execute as client a data transaction with a server. This data transaction is initiated by the PLC by implementing a communication with the server via web services. A WSDL file is called up and additional data during the generation of a user program of the PLC is provided. Function blocks for web applications are then automatically generated from this data and integrated in the user program.

12 Claims, 3 Drawing Sheets

SOAP in the TCP/IP protocol stack

| | SOAP | | |
|---|---|---|---|
| Application | HTTP | HTTPS | ... |
| Transport | TCP | | |
| Network | IP | | |

Network access    Ethernet    Token Ring    FDDI    ...

though by the web services standard many bordering conditions are already standardized and described, e.g., in a directory or by WSDL (Web Services Description Language), unique linkage between provider and user of the web service still has to be created, however—comparably with the program on the PLC in the prior art according to FIG. 1.

METHOD FOR GENERATING FUNCTION BLOCKS FOR WEB SERVICES

CROSS REFERENCE TO RELATED APPLICATIONS

This application claims priority of European Patent application No. 08003134.7 EP filed Feb. 20, 2008, which is incorporated by reference herein in its entirety.

FIELD OF INVENTION

The invention relates to methods for generating function blocks for web services.

A PLC (programmable logic controller) is understood to be a digital computer or a control device which is used for the automation of industrial processes, such as the control of machines or assembly lines, for example. The PLC is distinguished from a standard computer by a series of features:

For instance, it is designed for use in harsh environments, such as moisture, dust, heat, cold or vibration/shock. It is known as a real-time system which has to process a large number of input signals within a fixed, specified time, since unintentional operations can otherwise result.

For this, the input side of the PLC is connected to a large number of sensors via which it receives and processes numerous input signals (analog process variables such as temperature, pressure, etc.). On the output side the PLC is connected to actuators which it controls (electric motors, hydraulic cylinders etc.). In automatic control engineering, actuators can be described as the transducer-related counterpart of sensors and form the final controlling element in a control loop. They convert signals of a control system into (usually) mechanical work (for example a valve that opens or closes).

BACKGROUND OF INVENTION

In the prior art, a PLC of the type described in the introduction now carries out a data transaction with a server online, that is to say during continuous operation, for example during the control of a machine. This data transaction is initiated by the PLC, which establishes a TCP/IP connection to the appropriate server. The resulting network process is supported on the PLC side by a corresponding IEC program and on the server side by the associated process. The protocol that is used is the ISOonTCP protocol. The server receives the transaction request, carries out the appropriate operations and sends the transaction response back again to the PLC. The request for data (such as article number or serial number, for example) can be considered as a transaction, just like the transmission of data where process results are to be assigned to a serial number, for example.

The problem with such a procedure is the outlay involved with the creation of the PLC programs to execute the transactions. Among other things, what is important is that very close matching of the two programs is necessary as the implementation of new functions and modifications has to be effected in a detailed manner, both at the transmit end and at the receive end (at the client).

For this reason, a further option for executing such transactions has emerged in the prior art. Web services are used for this.

In principle—in comparison to web pages—web services are not intended for human users, rather for software systems which exchange data automatically and/or initiate functions on remote computers. In this case a web service is a software application which can be uniquely identified by a uniform resource identifier (URI) and is thus addressable and whose interfaces are defined as XML artifacts. A web service supports direct interaction with other software agents by using XML-based messages thru exchange via Internet-based protocols. Requests to a web service are made by client programs and the web service responds with the desired information.

A method, in which a PLC as client communicates with a web service, is known from U.S. Pat. No. 6,915,330. Here there is a problem in that the function blocks describing a web service, as well as the function blocks activating the web service, have to be specially realized for this web service, which in practice means a large outlay.

SUMMARY OF INVENTION

An object of the invention is to demonstrate a way by which communication between client and web services can be simplified.

The object of the invention is achieved by methods according to the independent claims.

The advantage of the invention is seen in the fact that during the generation of the user program of a PLC, a WSDL file is called, from which function blocks for web services are automatically generated from data stored in said file. These function blocks are then integrated in the user program. This considerably reduces the development outlay. Moreover, the implementation of the communication between the control level (for example the PLC) and the MES (manufacturing execution system) and ERP (enterprise resource planning) levels is supported by this procedure. The TIA (totally integrated automation) concept is therefore also implemented.

BRIEF DESCRIPTION OF THE DRAWINGS

The invention is explained in further detail below with the aid of an exemplary embodiment which is illustrated in figures, of which.

DETAILED DESCRIPTION OF INVENTION

Figures 1, 2:
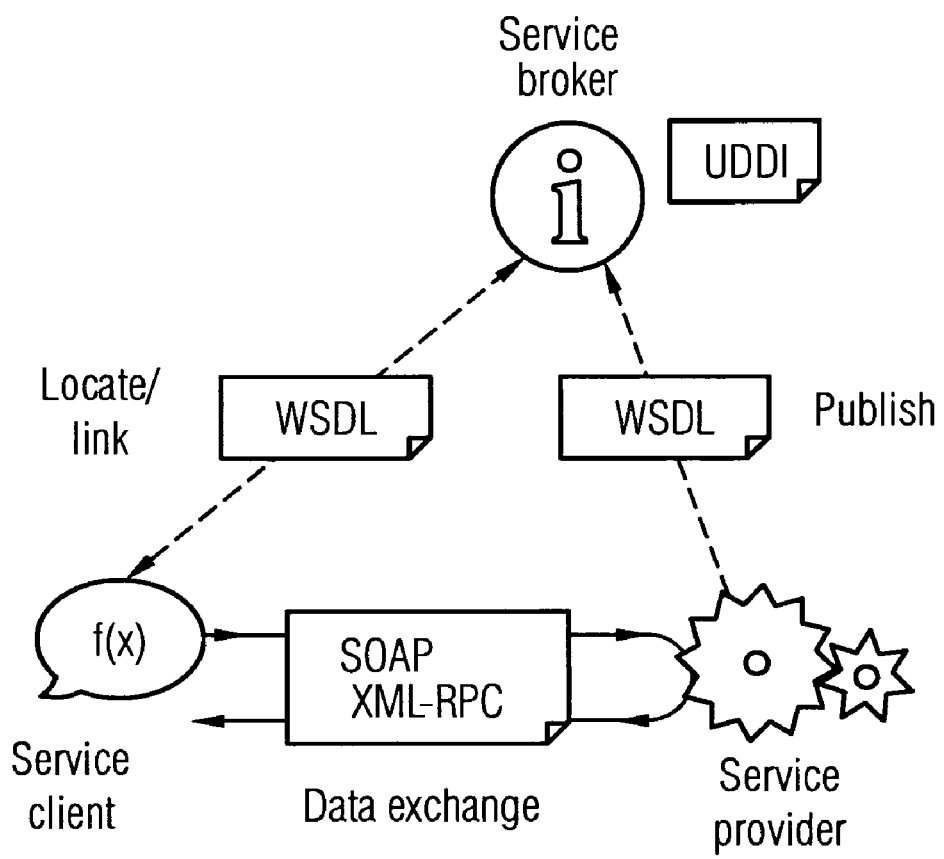
FIG. 1 shows the conditions which appear between client and server in the prior art.
FIG. 2 shows the SOAP protocol in the TCP/IP protocol stack according to the prior art.

FIG. 1 shows the basic conditions between server and client in the prior art. The provider of a web service publishes the description of his web services in a directory on a server. The client searches the directory and selects the desired web service. After protocol details have been exchanged, the dynamic link from the client to the provider is established. On this occasion the client now draws on methods which basically form three standards, each of which is based on the XML language:

1. UDDI as directory service for registering web services. It enables the dynamic location of a web service by the client.
2. WSDL (web service description language) for the description of the supported methods and their parameters for the programmer.
3. SOAP (or XML-RPC) for communication. The actual call is started here.

Web services represent the three most important parts of the collaboration between client and server: mutual location, link-up and data exchange.

SOAP (originally simple object access protocol) is a network protocol by means of which data can be exchanged between systems and remote procedure calls realized. SOAP is a lightweight protocol for the exchange of XML-based messages via a computer network. It establishes rules for the message design, it controls how data is to be displayed and interpreted in the message, and specifies a convention for remote procedure calls by means of SOAP messages. SOAP is based on the services of other standards: XML for representation of the data and Internet protocols of the transport and application layer (see TCP/IP reference model) for transmission of the messages. The most common combination is SOAP over http/https and TCP.

FIG. 2 shows the link between SOAP and the TCP/IP protocol stack. A minimal SOAP message consists of a so-called "envelope" element, to which a local name must be assigned. The central component of this element must be a body element. An optional header element which can accommodate metadata, for example for routing, for encryption or for transaction identification, can precede it. The actual user data (data block) is placed in the body element.

Figure 3:
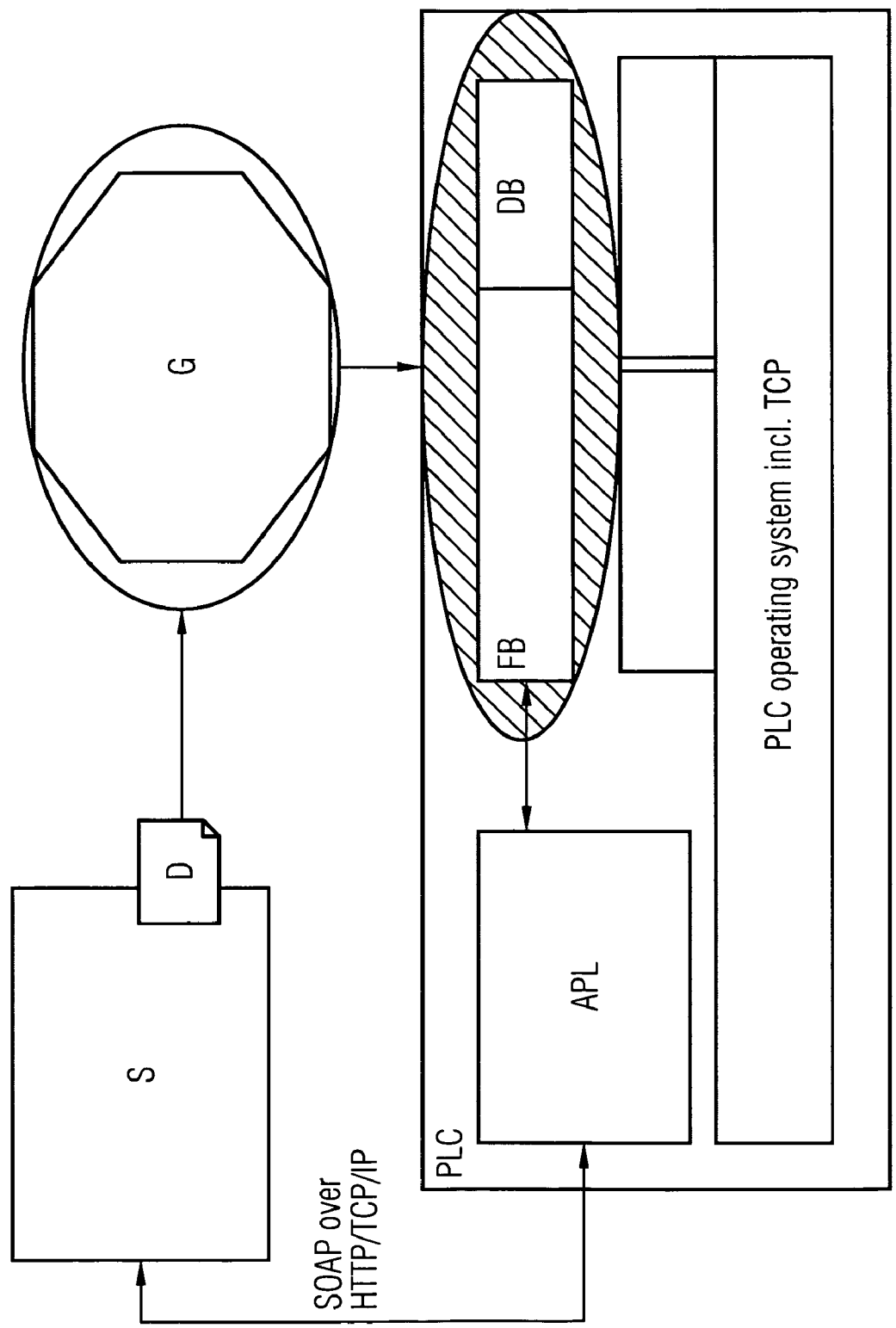
FIG. 3 shows the conditions in the PLC control device which has the functionality of a client.

In FIG. 3 a configuration is described in which the inventive method operates for a client. Accordingly, a PLC control device is provided, which has the functionality of a client and which is intended to access a specific web service WS during continuous operation. This web service is defined and stored on a server S. To this end, prior to the start-up of the client PLC, that is to say in the course of the generation of the user program APL which subsequently runs on this client PLC, the inventive generator program G is started. At the same time, the generation process can be carried out independently of the client PLC, for example on a personal computer.

At the start of the generation process, a WSDL file D is called by the generator program G. This file can be stored on a server S of the web service provider or sent via email, for example. WSDL file D describes the corresponding web service WS in a logically abstract language.

It is assumed in the present exemplary embodiment that the WSDL file D contains the definition of a plurality of web services WS. Consequently, a selection of web services initially appears, from which the desired web service WS can be selected. If the selected web service WS is just a simple web service, the generation of the function block FB can be started by the generator program G at this point.

If the selected web service WS is a more complicated service, the configuration of the web service connection is effected in a further step. For this, the IP address (host name including domain) as well as the port address (default http:80) of the server S on which the web service runs, must be entered. Paths, SOAP actions and the name for the SOAP envelope must be specified.

The input parameters (request parameters) should then be set as shown below. These are the parameters which are passed to the corresponding web service WS when this is called up. The specification of these parameters is absolutely necessary for the desired functionality of the function block FB. Equally so is the definition of the mapping between the XML language and the DB notation. For this, the following parameters must be specified:

the parameter name/address in the data block DB
the parameter type in the data block DB
the maximum field length in the data block DB
type conversions must be implemented if necessary (for example INT-->xsd:string)
the mapping of the XML node on the parameter name/address in the data block The same applies to the setting of the output parameters (response parameters). Naturally, only the parameters which are absolutely necessary of the desired function block are set here. The mapping between the XML language and the DB notation should likewise be defined as in the case of the above-mentioned request parameters. It should be noted that, if necessary, the XML is truncated when specifying the maximum field length in the data block. The reason for this is that the storage capacity of the PLC control device is limited.

Finally, the generation of the function block FB is now started in the generator program G. In addition to this, there is now access to all existing data (WSDL file data and input information). As a result of this process, the function blocks FB are generated along with the data (data block DB). These generated data blocks are thus available for integration and use in applications programs APL.

Figure 4:
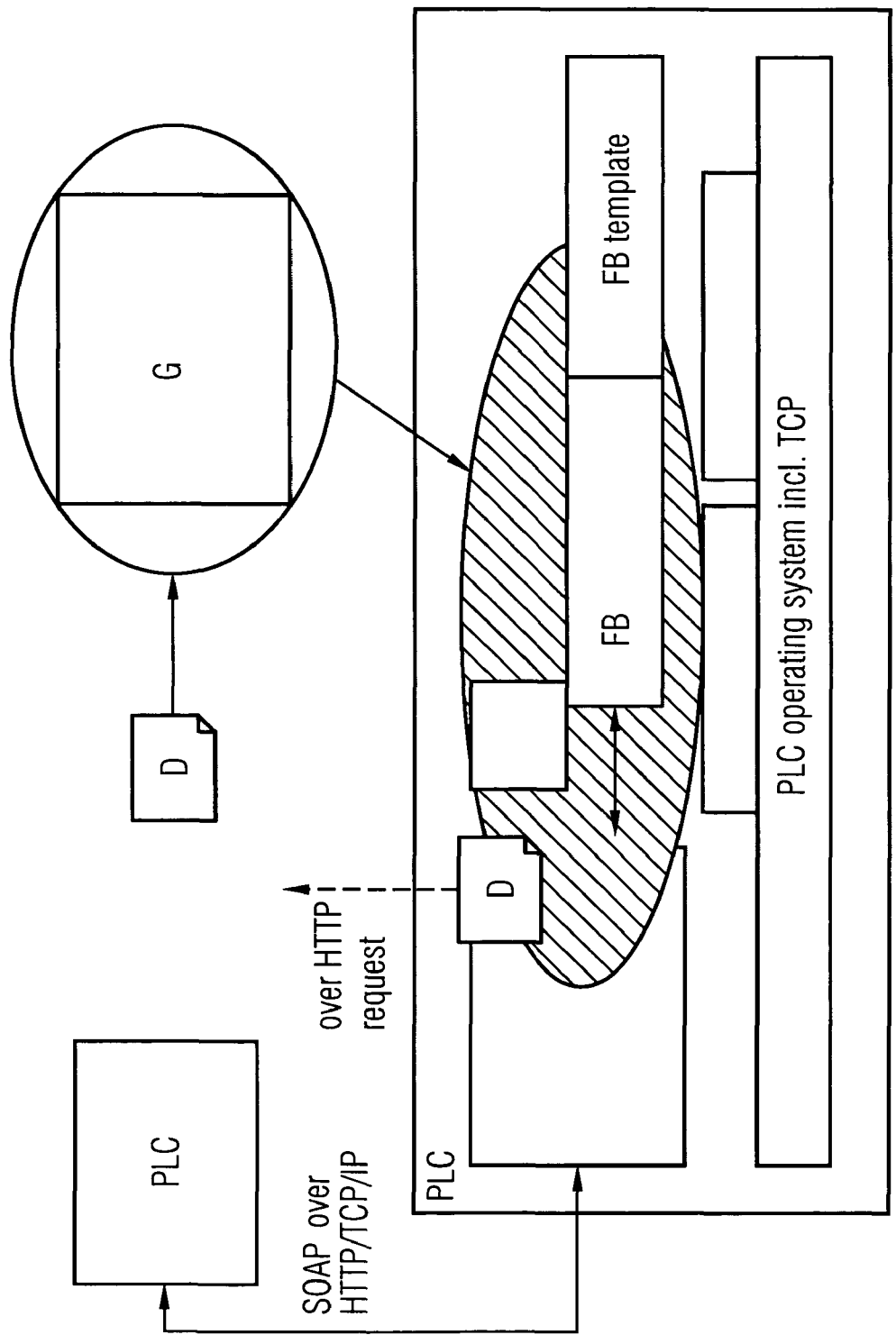
FIG. 4 shows the conditions in the PLC control device which has the functionality of a server.

A configuration is described in FIG. 4, in which the inventive method operates for a server. Accordingly, a PLC control device is provided, which has the functionality of a server S and which is intended to provide a specific web service WS during continuous operation. To this end, the generator program G* is started prior to the start-up of the PLC control device, that is to say during the generation of a user program APL*. In this case the generation process can also be implemented independently of the PLC control device, for example on a personal computer.

At the beginning of the generation process, a WSDL file D is first called by the generator program G*. According to the present exemplary embodiment it is assumed that the WSDL file D contains the definition of a plurality of web services WS. Consequently, first of all a dropdown menu appears, in which the desired web service WS can be selected. The provision of additional data in the context of a configuration (web service connection, input parameters, output parameters) is made analogously to the PLC as client.

Subsequently, the generation of function blocks FB is started in the generator program G*. As a result of this process, these function blocks FB are thus generated along with a function block template and integrated into the application program APL*. The latter still has to be specially programmed since in this case the return values are transferred to the calling client when the web service is called up. Finally, the application program APL* generated in this way has to be stored and configured along with the function blocks on the control device in an executable manner.

Finally, provision is made in the generator program G, G* for the generated function blocks to undergo a test by which the desired result can be checked.

The invention claimed is:

1. A method for supporting communication between a PLC control device functioning as a client and a web service defined and stored on a server, during continuous operation, comprising:

calling up by a generator program a Web Service Description Language (WSDL) file containing a definition of a plurality of web services (WS) for selection;

selecting by the generator program a desired web service WS from the WSDL file, including additional data stored in the WSDL file;

configuring by the generator program based on the additional data a web service connection for communication between the PLC functioning as the client and the web service WS;

setting request parameters by the generator program based on the additional data for integration into the PLC;

setting response parameters by the generator program based on the additional data for integration into the PLC;

automatically generating a function block and a data block based on the additional data, including the request parameters and the response parameters; and integrating the function block and the data block into a user program that runs on the PLC for enabling the PLC to interact with the web service.

2. The method as claimed in claim 1, wherein the generation of the user program as well as a generation of the function block and the data block are controlled by a higher-order generator program carried out independently of the PLC functioning as a client.

3. The method as claimed in claim 2, wherein an automatic test for verifying the operating capability of the communication is carried out on completion of the generation of the function blocks by the higher-order generator program.

4. The method as claimed in claim 1, wherein the additional data contains addresses and a type of transmission protocol for web service connection configuration.

5. The method as claimed in claim 1, wherein the additional data contains request/response parameters comprising parameter name/address, parameter type, maximum field length, each adapted to be in a data block DB, and further comprise a mapping between XML language and the data block DB.

6. The method as claimed in claim 5, wherein the XML is truncated when specifying the maximum field length in the data block DB to match a limited storage capacity of the client.

7. The method as claimed in claim 1, wherein an automatic test for verifying the operating capability of the communication is carried out on completion of the generation of the function blocks by the generator program.

8. A method for provision of a web service by a PLC control device functioning as a server during continuous operation, comprising:

calling up by a generator program a Web Service Description Language (WSDL) file containing a definition of a plurality of web services (WS) for selection;

selecting by the generator program a desired web service WS from the WSDL file, including additional data stored in the WSDL file;

configuring by the generator program based on the additional data a web service connection for communication between a PLC functioning as a client and the PLC control device functioning as the server providing the web service WS;

setting input parameters by the generator program based on the additional data for integration into the PLC control device functioning as the server;

setting output parameters by the generator program based on the additional data for integration into the PLC control device functioning as the server;

automatically generating the function block and a template function block based on the additional data; and integrating the function block and template function block into an application program stored on the PLC control device functioning as a server.

9. The method as claimed in claim 8, wherein the generation of the function block and template function block is controlled by a higher-order generator program carried out independently of the PLC.

10. The method as claimed in claim 8, wherein the additional data contains addresses and a type of transmission protocol for web service connection configuration.

11. The method as claimed in claim 8, wherein the additional data contains input and output parameters comprising parameter name/address, parameter type, maximum field length.

12. The method as claimed in claim 8, wherein the XML is truncated when specifying the maximum field length to match a limited storage capacity of the PLC.

* * * * *